US008321671B2

(12) United States Patent
Yao et al.

(10) Patent No.: US 8,321,671 B2
(45) Date of Patent: Nov. 27, 2012

(54) METHOD AND APPARATUS FOR CLIENT-DRIVEN PROFILE UPDATE IN AN ENTERPRISE WIRELESS NETWORK

(75) Inventors: Zongming Yao, Shanghai (CN); Kapil Sood, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 347 days.

(21) Appl. No.: 12/655,191

(22) Filed: Dec. 23, 2009

(65) Prior Publication Data

US 2011/0154035 A1 Jun. 23, 2011

(51) Int. Cl.
*H04L 29/06* (2006.01)
(52) U.S. Cl. .............................. 713/168; 713/184; 726/7
(58) Field of Classification Search .................. 713/168, 713/184; 726/7
See application file for complete search history.

(56) References Cited

U.S. PATENT DOCUMENTS

| 6,802,000 | B1 * | 10/2004 | Greene et al. ................. 713/168 |
| 2004/0139331 | A1 * | 7/2004 | Sanai et al. .................. 713/184 |
| 2004/0230843 | A1 * | 11/2004 | Jansen .......................... 713/202 |
| 2007/0089166 | A1 * | 4/2007 | Medjitov ........................... 726/5 |
| 2011/0252229 | A1 * | 10/2011 | Belenkiy et al. .............. 713/155 |
| 2011/0277021 | A1 * | 11/2011 | Ogawa .............................. 726/6 |

* cited by examiner

*Primary Examiner* — Edan Orgad
*Assistant Examiner* — Brian Olion
(74) *Attorney, Agent, or Firm* — Grossman, Tucker, Perreault & Pfleger, PLLC

(57) ABSTRACT

A technique for allowing client-driven profile updates in a wireless network uses a shared character password and a shared image that is known by both a client device and a network server. In some embodiments, a random character table is generated by a client device and is used, along with the shared character password and shared image, to calculate a one-time password (OTP). The OTP is then used to both encrypt and sign a new security profile to be delivered to the network server in a profile update request. The server may then generate the same OTP using information within the request and the shared character password and shared image. The new profile may then be decrypted and validated within the server.

20 Claims, 6 Drawing Sheets

US 8,321,671 B2

METHOD AND APPARATUS FOR CLIENT-DRIVEN PROFILE UPDATE IN AN ENTERPRISE WIRELESS NETWORK

TECHNICAL FIELD

The invention relates generally to wireless networks and, more particularly, to security techniques in an enterprise wireless network.

BACKGROUND OF THE INVENTION

Newly approved wireless security related standards have already largely improved the robustness of wireless networks. However, these standards have a major drawback in common. That is, none of them provide an adequate solution to timely and automatically update the security profiles that are used in user authentication procedures in a wireless network.

In most enterprise wireless networks, the network administrator typically sets up a wireless security profile on both the client side and the wireless backend side (e.g., authenticators, RADIUS server, etc.) before delivering the client device to the wireless user. Later, if the administrator wants to update the security profile to improve overall robustness in the wireless network, he/she would have to update the security profile in both the wireless backend devices and the client devices. This would require that the administrator get the client devices back from the wireless users and manually update the security profiles. For a network with a relatively small number of wireless users, this approach is doable. However, for a large company with thousands of wireless users, this manual approach is a major undertaking. For this reason, the administrator may rarely update the wireless security profiles of wireless client devices. In addition, the wireless users are not able to update their own profiles. In the long run, these circumstances may lead to significant security problems that could benefit attackers and compromise the entire wireless network. There is a need for techniques and structures that simplify the process of updating security profiles on client devices in a wireless network.

DETAILED DESCRIPTION

Figure 1:
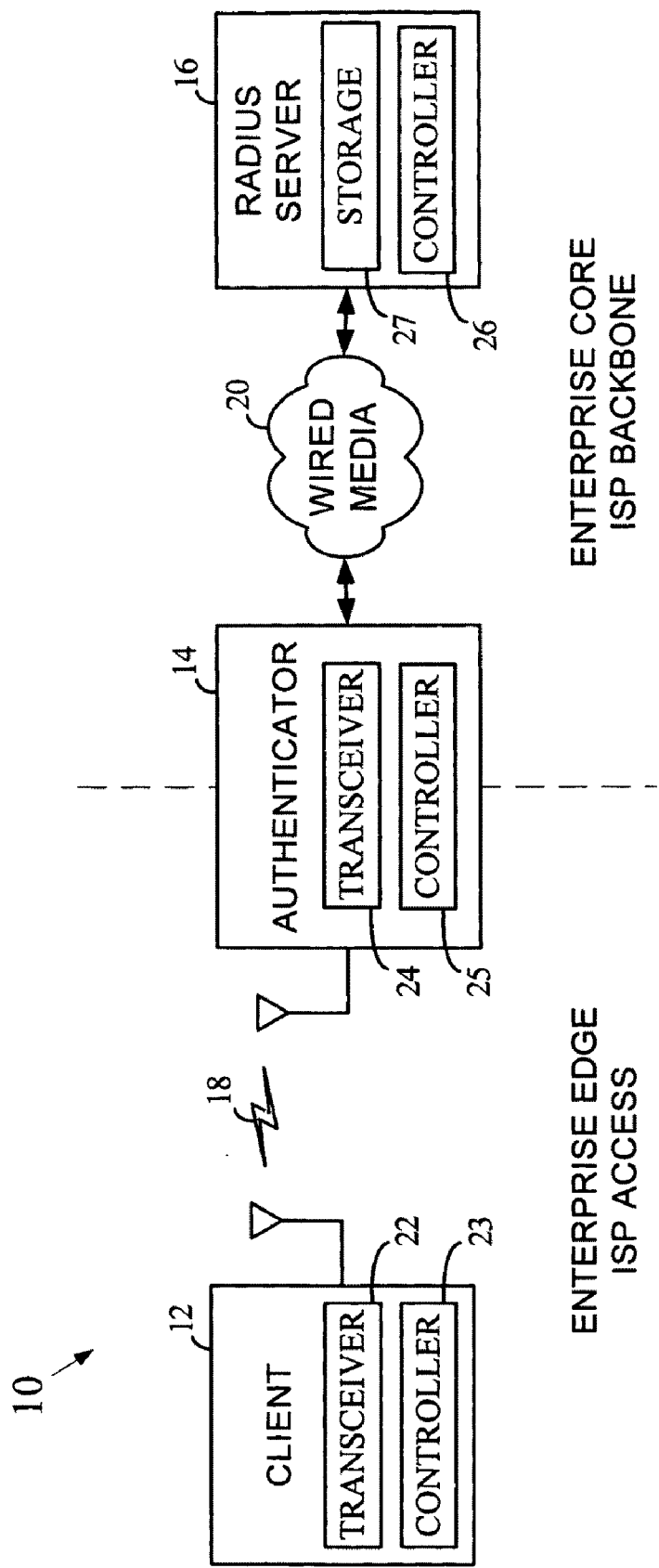
FIG. 1 is a block diagram illustrating a wireless network that may incorporate features of the present invention.
Figure 2:
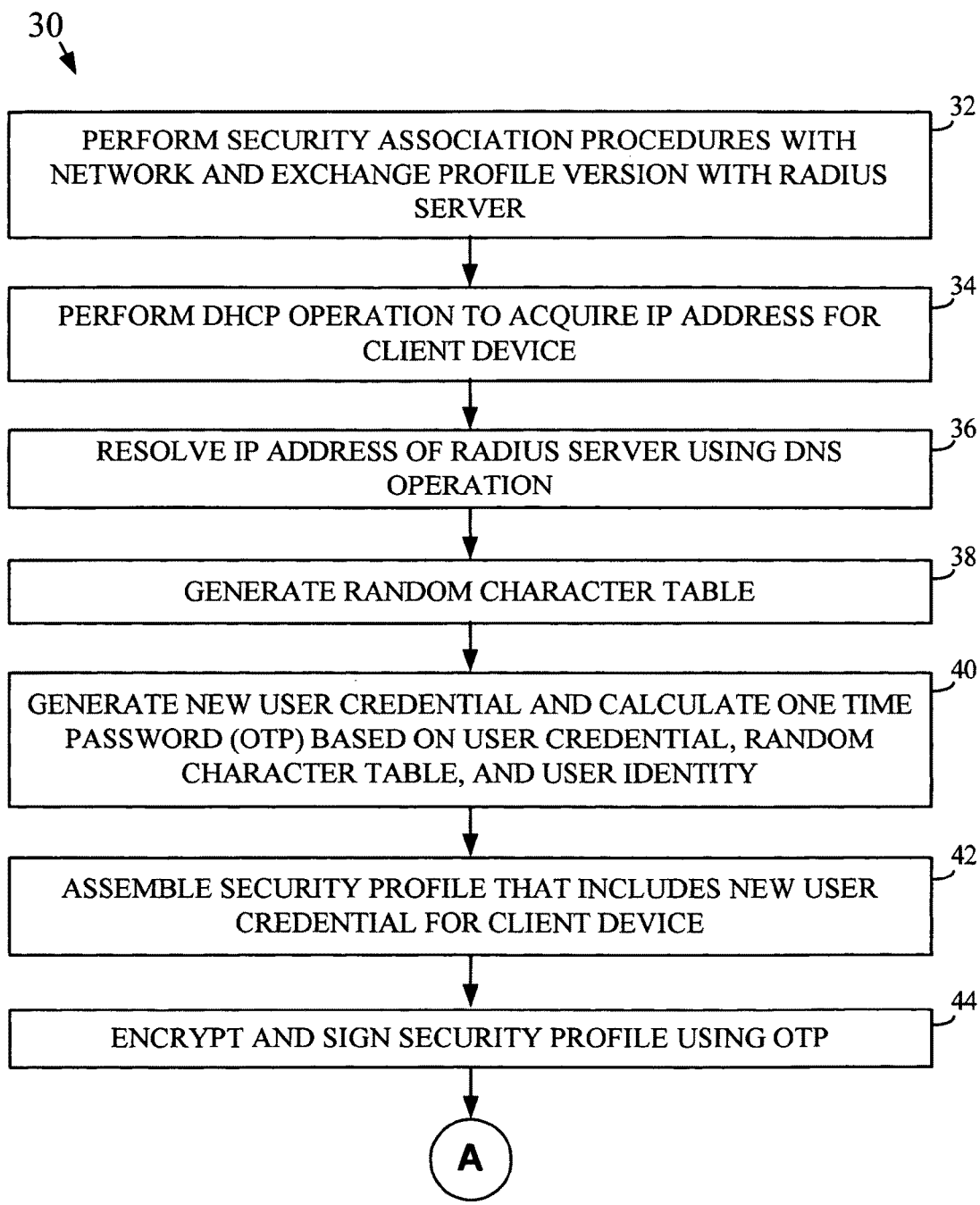
FIGS. 2, 3, 4, and 5 are portions of a flowchart illustrating a client-driven profile update method in accordance with an embodiment of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 is a block diagram illustrating a wireless network 10 that may incorporate features of the present invention. In the illustrated embodiment, the wireless network 10 is a wireless enterprise network that supports IEEE 802.1X authentication, although other types of wireless network and other authentication standards may be used in other embodiments of the invention. As illustrated, the wireless network 10 includes at least: a client device 12, an authenticator 14, and a RADIUS server 16. The client device 12 may include any type of wireless communication device that is capable of accessing a wireless network. The client device 12 communicates with the authenticator 14 via wireless link 18 to request access to the network. The authenticator 14 then acts in combination with the RADIUS server 16, via wired medium 20, to perform authentication and authorization functions to determine whether access is permitted for the user. If access is permitted, the client device 12 will be able to communicate over the wired media 20 with other entities in the network.

As shown in FIG. 1, the client device 12, the authenticator 14, and the RADIUS server 16 may each include a digital controller 23, 25, 26 to perform communication related functions for the respective devices. The controllers 23, 25, 26 may each include one or more digital processing devices such as, for example, a general purpose microprocessor, a digital signal processor (DSP), a reduced instruction set computer (RISC), a complex instruction set computer (CISC), a field programmable gate array (FPGA), an application specific integrated circuit (ASIC), a microcontroller, and/or others. In the illustrated embodiment, the client device 12 and the authenticator 14 each include a wireless transceiver 22, 24 for use in communicating wirelessly with each other and with other wireless entities. These wireless transceivers 22, 24 may be configured in accordance with one or more wireless networking or wireless cellular standards. Although not shown, the authenticator 14 and the RADIUS server 16 may each also include a wired transceiver to communicate with one another over the wired network media 20. The RADIUS server 16 may also include digital storage 27 to store, for example, shared character passwords for a number of different client devices and shared images for a number of different client devices. The digital storage 27 may include any type of device that is capable of storing digital data, preferable in a non-volatile form. The digital storage 27 may include, for example, semiconductor memories, magnetic storage media, optical storage media, and/or others, including combinations of the above. It should be appreciated that the wireless network architecture of FIG. 1 is merely an example of an architecture that may implement features of the present invention. That is, wireless networks using others architectures may also benefit from implementation of inventive features.

The client device 12 has a security profile stored within it that is used during the authentication and authorization process to determine whether the corresponding user is permitted to access the network. The security profile may be transmitted to the authenticator 14 along with the access request. The authenticator 14 and the RADIUS server 16 may then compare the profile to a stored profile to determine whether the user is who he claims to be. If so, and the person is authorized to access the network, access will be granted. IEEE 802.1X is only a framework and is not a complete specification. The actual IEEE 802.1X authentication mechanism is implemented by the authenticator 14. IEEE 802.1X supplies a mechanism for issuing challenges and confirming or denying access, but it does not pass judgment on the offered credentials. In the enterprise scenario, the client device 12 is a corporate host on the edge of the enterprise wireless network, and the RADIUS server 16 is located in the enterprise core. One of the advantages of using a RADIUS server 16 is that it has a great deal of support for many different user databases. In addition to local databases, a RADIUS server 16 can be used as a gateway to LDAP directories, Unix authentication (such as NIS or PAM), Kerberos realms, Microsoft Windows user accounts, or even other RADIUS servers. The client device 12, the authenticator 14, and the RADIUS server 16 may each include one or more digital controllers to control communication activity thereof.

The security profile is typically loaded into the client device 12 by a network administrator before the device is physically transferred to the assigned user. After the client device has been transferred to the user, the stored profile will be used from that point on. If an administrator eventually decides that the profile of one or more users needs to be updated, the administrator will ask the user to bring back the client device for manual update. If it is desired that all users in a large organization update their profiles, a major effort is required to have all users return their devices to the administrator for manual profile update. In one aspect of the present invention, techniques are provided that permit client-driven profile updates in a wireless network that do not require users to return their devices to a network administrator. That is, the user can initiate a profile update from his client device regardless of his present location, as long as he has access to the network.

In at least one embodiment of the invention, both the client device 12 and the RADIUS server 16 store a shared character password and a shared image. The client device 12 generates a random character table which it uses, along with the shared character password and the shared image, to formulate a one-time password (OTP) and a new security profile. The device then encrypts and signs the new profile using the OTP. A profile update request is then transmitted to the authenticator 14 that includes the random character table, the user identity, and the encrypted profile. The authenticator passes the profile update request to the RADIUS server 16, which uses the random character table and the user identity from the request, along with stored versions of the shared character password and shared image, to calculate the OTP. The OTP is then used to decrypt and verify the new profile. The new profile is then assigned a version number and stored. The RADIUS server 16 then transmits a profile update response to the authenticator 14 which relays the response to the client device 12.

FIGS. 2, 3, 4, and 5 are portions of a flowchart illustrating a client-driven profile update method 30 in accordance with an embodiment of the present invention. In at least one implementation, the method 30 is executed in large part by digital processors within network components, such as client devices, authenticators, and RADIUS servers (e.g., controllers 22 and 26 in FIG. 1). The digital processors may execute computer executable instructions that are, for example, stored on a digital storage medium. To perform a profile update, a client device must have access to the network. Thus, if not connected, the device may first have to perform a security association procedure with the network and exchange the present version of the security profile (i.e., the non-updated version) with the RADIUS server (block 32). Once associated, the client device may next initiate a Dynamic Host Configuration Protocol (DHCP) procedure to acquire an internet protocol (IP) address for itself (block 34). The domain address of the RADIUS server is unique and may be preconfigured into all client devices by the enterprise administrator. Thus, the client device may next need to initiate a DNS procedure to resolve the IP address of the RADIUS server (block 36).

Figure 6:
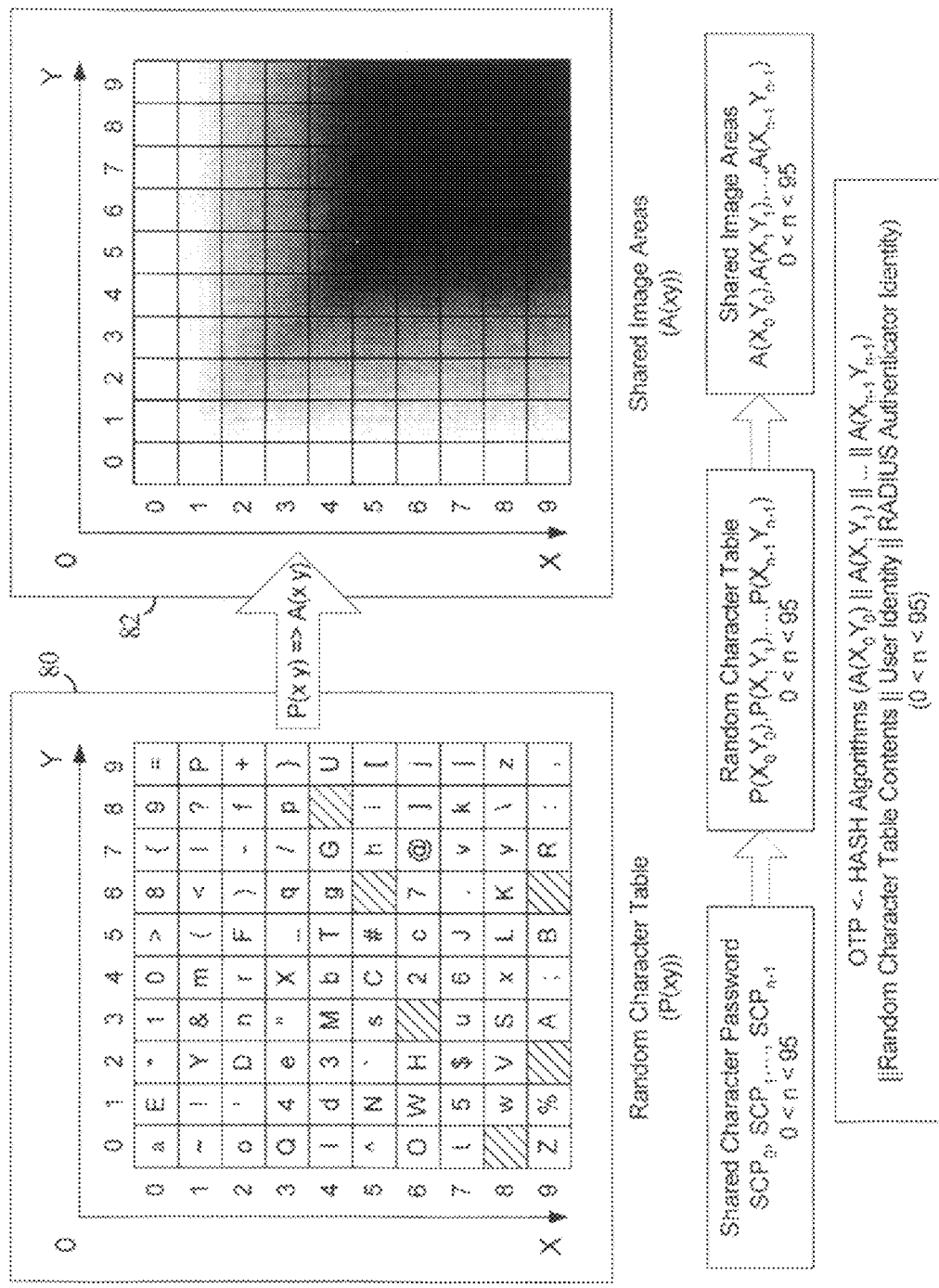
FIG. 6 is a diagram illustrating an example random character table and an example shared image in accordance with an embodiment of the present invention.

After the IP address of the RADIUS server has been resolved, the update process may begin. The client device may first generate a random character table to be used during the update procedure (block 38). As will be described in greater detail, both the client device and the RADIUS server will use the random character table generated by the client device to calculate a one-time password (OTP) for use during the update. FIG. 6 illustrates an example random character table 80 in accordance with an embodiment of the present invention. As shown, the example character table 80 has 10 rows and 10 columns and includes the specific characters that may be used to compose a password. The characters within the table 80 are all different from one another and are randomly generated. In addition, six of the positions in the table 80 include blank characters, which cannot be used in the password. This leaves 96 characters for composing the OTP. It should be understood that many alternative random character table formats may be used.

After the random character table has been generated, the client device may generate the new user credential and use it to calculate the OTP (block 40). As described previously, both the client device and the RADIUS server may have a shared character password and a shared image stored therein for use during profile update procedures. The shared character password and the shared image can, for example, be generated by a network administrator and stored in the client device and RADIUS server before the client device is delivered to the end user. The shared character password may include a string of characters, all of which will be within the random character table. The shared image will be an image having image portions arranged in the same manner as the characters in the random character table. For example, FIG. 6 illustrates a shared image 82 that may be used with the random character table 80 discussed previously. As shown in the figure, the shared image 82 is split into 100 image areas in a 10×10 arrangement. The individual image portions should be different from one another and may be randomly generated.

The first step in generating the new user credential is to find each of the characters of the shared character password within the random character table and note the locations of these characters. For example, if the shared character password is "aED4d" then, using the random character table 80 of FIG. 6, the locations would be (0,0), (0,1), (2,2), (3,1), and (4,1). Image portions at these same locations are then selected out of the shared image as A(0,0), A (0,1), A (2,2), A (3,1), and A (4,1). These image portions are used as the user credentials. Once the user credentials have been generated, the OTP may be calculated by using a hash algorithm. For example, using the image portions described above, the hash algorithm may be used as follows:

$$OTP = HASH(A(00) \| A(01) \| A(22) \| A(31) \| A(41) \| \text{Random Character Table Contents} \| \text{User Identity} \| \text{Radius Authenticator Identity})$$

In at least one embodiment, an inconvertible hash algorithm is used. In one implementation, the generated OTP will have two parts: an OTP-ED part for encryption/decryption and an OTP-SV part for signature and validation. The OTP-ED can be used to encrypt and later decrypt the new security profile. The OTP-SV can be used to sign and later validate the new security profile. After the OTP has been generated, a security profile is assembled that includes the new user credential (block 42). The security profile is then encrypted and signed using the OTP (block 44).

Figure 3:
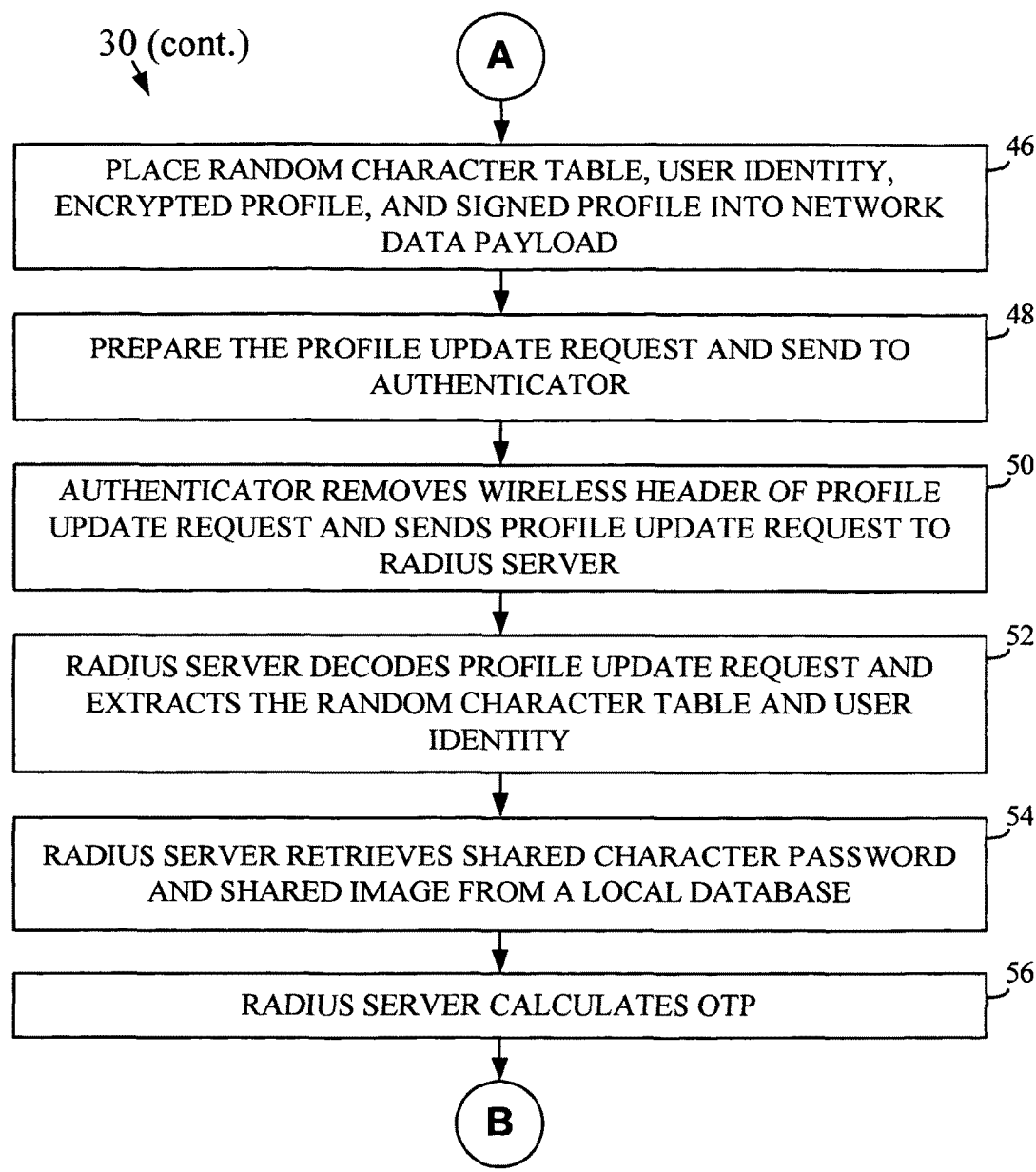

Referring now to FIG. 3, the random character table, the user identity, the encrypted profile, and the signed profile may now be placed into a network data payload (block 46). In one approach, the payload will be encapsulated with TCP/UDP, although this is not required. The signed profile will act as a message integrity check (MIC) for the message. A profile update request that includes the payload is then generated and transmitted from the client device to the authenticator (block 48). The authenticator removes the wireless header from the profile update request and relays the profile update request to the RADIUS server (block 50).

When the RADIUS server receives the profile update request, it will decode the request and extract the random character table and the user identity (block 52). Using the user identity, the RADIUS server may then retrieve the shared character password and the shared image associated with the user from a local database (block 54). The RADIUS server may then use the random character table, the shared character password, and the shared image to calculate the OTP (block 56). The shared character password may be calculated using a hash algorithm, as described previously.

Figure 4:
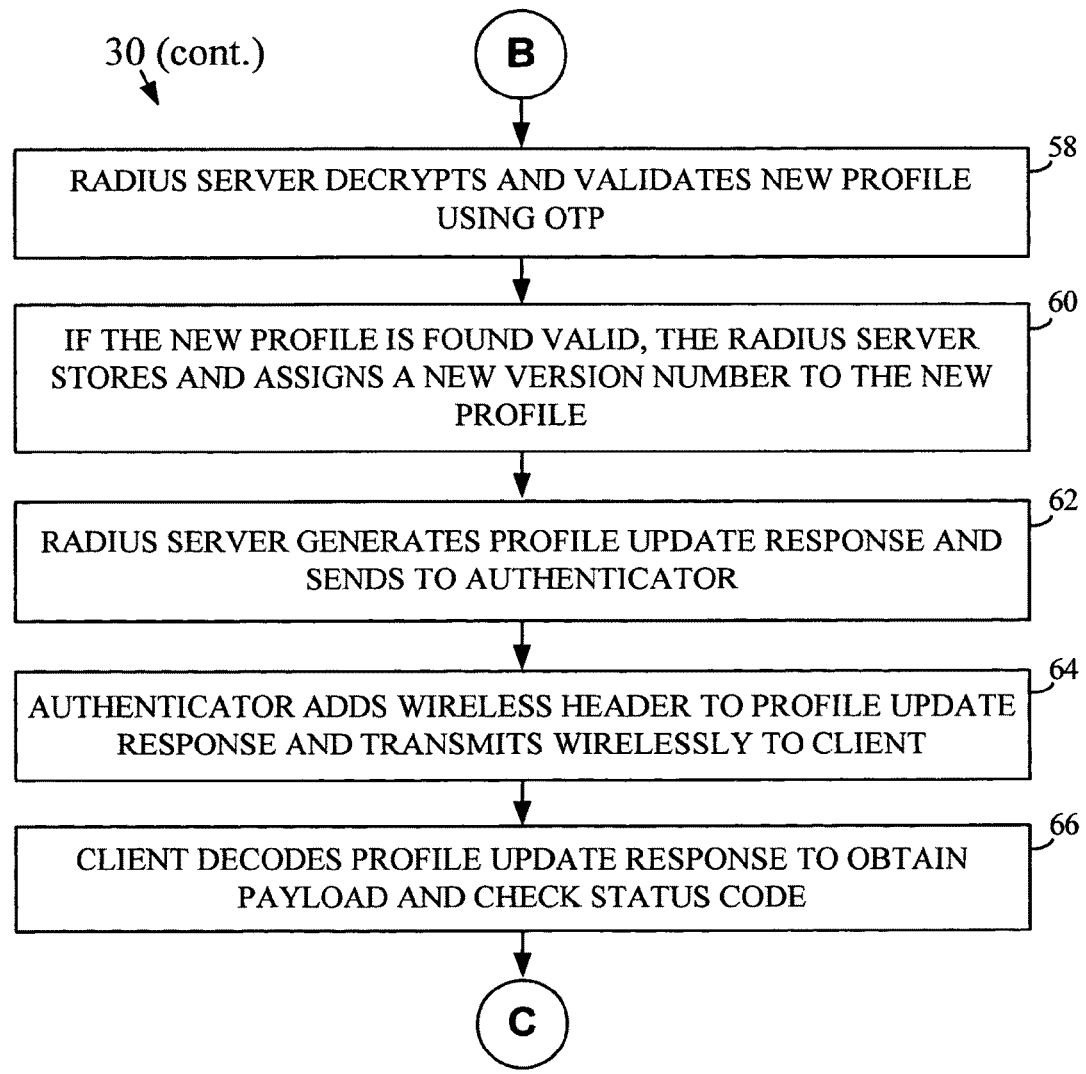

Turning to FIG. 4, the RADIUS server may now use the OTP to decrypt and validate the new profile (block 58). If the new profile is found valid, the RADIUS server may assign a new version number to the new profile and store the profile for later use (block 60). The RADIUS server may then generate a profile update response message and send the message to the authenticator (block 62). Among other things, the profile update response may include a status code indicating whether or not the RADIUS server has successfully updated the security profile of the client. The authenticator adds a wireless header to the profile update response message and transmits the message to the client device (block 64). The client device may now decode the profile update response message to obtain the payload thereof and check the status code to determine whether the update was successful (block 66).

Figure 5:
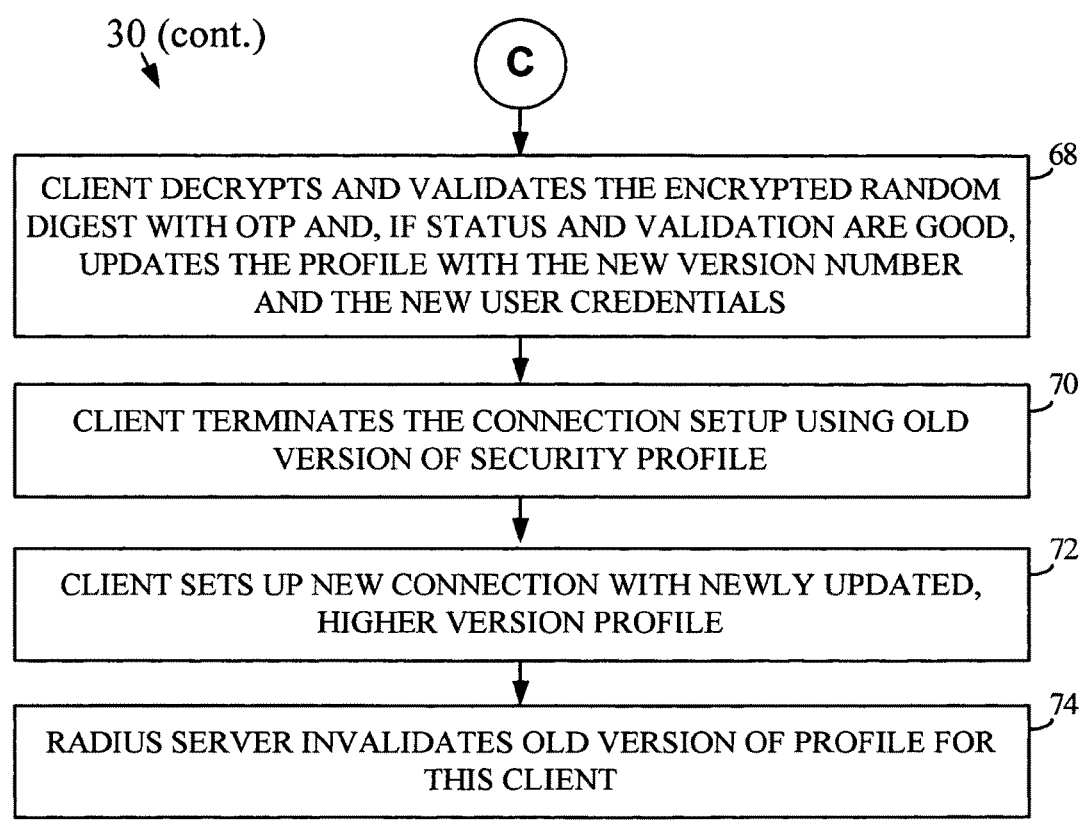

With reference to FIG. 5, the client device may next decrypt and validate the random digest with the OTP (block 68). If the status and the validation are good, the client may update the profile with the new version number and the new user credentials (block 68). The client may then terminate the connection to the network that was set up using the old version of the security profile (block 70) and set up a new connection using the new profile (block 72). Once the new connection is established, the RADIUS server may invalidate the old version of the profile for this client (block 74). From this point forward, the client must use the new profile to establish a connection to the network.

By using the shared character password and the shared image as described above, client driven profile updates may be performed that are highly resistant to attack. The techniques can make it very difficult or impossible for an attacker to figure out the OTP using methods such as, for example, guessing, spyware or keylogging, shoulder-surfing, dictionary attack, social engineering, and/or others. Aspects of the present invention may be used in connection with a wide variety of different wireless networking standards including, for example, IEEE 802.11, IEEE 802.1X, IEEE 802.15, IEEE 802.16, and/or others. The techniques described above can further be used to update the shared character password and the shared image credentials stored in the client device and the RADIUS server. For example, either of these data structures may be attached to the new higher version profile during the profile update procedure. To further improve security, the administrator may use cryptography techniques to make the shared character password, the shared image credential, and/or the security profile invisible to the client user. This technique will reduce the security risks typically associated with improper user behaviors.

The techniques and structures of the present invention may be implemented in any of a variety of different forms. For example, features of the invention may be embodied within laptop, palmtop, desktop, and tablet computers having wireless capability; personal digital assistants (PDAs) having wireless capability; cellular telephones and other handheld wireless communicators; pagers; satellite communicators; cameras having wireless capability; audio/video devices having wireless capability; network interface cards (NICs) and other network interface structures; base stations; wireless access points; integrated circuits; as instructions and/or data structures stored on machine readable media; and/or in other formats. Examples of different types of machine readable media that may be used include floppy diskettes, hard disks, optical disks, compact disc read only memories (CD-ROMs), digital video disks (DVDs), Blu-ray disks, magneto-optical disks, read only memories (ROMs), random access memories (RAMS), erasable programmable ROMs (EPROMs), electrically erasable programmable ROMs (EEPROMs), magnetic or optical cards, flash memory, and/or other types of media suitable for storing electronic instructions or data.

In some embodiments of the invention, as described above, aspects of the invention may be implemented as computer executable instructions stored on a computer readable medium. The instructions may be executed on any type of digital processing device including, for example, a general purpose microprocessor, a digital signal processor (DSP), a reduced instruction set computer (RISC), a complex instruction set computer (CISC), a field programmable gate array (FPGA), an application specific integrated circuit (ASIC), and/or others, including combinations of the above. Hardware, software, firmware, and hybrid implementations may be used.

In the foregoing detailed description, various features of the invention are grouped together in one or more individual embodiments for the purpose of streamlining the disclosure. This method of disclosure is not to be interpreted as reflecting an intention that the claimed invention requires more features than are expressly recited in each claim. Rather, as the following claims reflect, inventive aspects may lie in less than all features of each disclosed embodiment.

Although the present invention has been described in conjunction with certain embodiments, it is to be understood that modifications and variations may be resorted to without departing from the spirit and scope of the invention as those skilled in the art readily understand. Such modifications and variations are considered to be within the purview and scope of the invention and the appended claims.

What is claimed is:
1. A computer implemented method comprising:
  generating a random character table and storing said random character table in a memory, said random character table having a plurality of randomly generated characters;
  determining locations of characters of a shared character password within said random character table;
  retrieving image areas from a shared image that have the same locations within said shared image that said char- acters of said shared character password have within said random character table, said image areas serving as user credentials;
calculating a one-time password (OTP) by applying at least said user credentials and said random character table to a hash function;
encrypting a security profile that includes said user credentials using said OTP to generate an encrypted profile;
signing said security profile using said OTP to generate a signed profile; and
sending a profile update request to a wireless network server, said profile update request including said random character table, said user identity, said encrypted profile, and said signed profile.

2. The method of claim 1, wherein:
generating a random character table includes generating a 10×10 table of characters that includes N blank characters, where N is an integer less than 100, wherein said shared image includes 10×10 image areas.

3. The method of claim 2, wherein N is equal to 6.

4. The method of claim 1, wherein:
said hash function is an inconvertible hash function.

5. The method of claim 1, wherein:
calculating a one-time password (OTP) includes applying said user credentials, said random character table, said user identity, and a RADIUS authenticator identity to said hash function.

6. A computer implemented method comprising:
receiving a profile update request from a remote client device, said profile update request including a random character table, a user identity, an encrypted profile, and a signed profile;
decoding said profile update request and extracting said random character table and said user identity;
retrieving a shared character password and a shared image from a memory, based on said user identity;
determining locations of characters of said shared character password within said random character table;
retrieving image areas from said shared image that have the same locations within said shared image that said characters of said shared character password have within said random character table, said image areas serving as user credentials;
calculating a one-time password (OTP) by applying at least said user credentials and said random character table to a hash function;
decrypting said encrypted profile and validating said signed profile using said OTP; and
when said profile is validated, assigning a new version number to said profile and storing said profile.

7. The method of claim 6, wherein:
said random character table comprises a 10×10 table of characters that includes N blank characters, where N is an integer less than 100, wherein said shared image comprises 10×10 image areas.

8. The method of claim 7, wherein N is equal to 6.

9. The method of claim 6, wherein:
said hash function is an inconvertible hash function.

10. The method of claim 6, wherein:
calculating a one-time password (OTP) includes applying said user credentials, said random character table, said user identity, and a RADIUS authenticator identity to said hash function.

11. A wireless communication device comprising:
a wireless transceiver to communicate with a remote wireless entity; and
a controller programmed to:
generate a random character table having a plurality of randomly generated characters;
determine locations of characters of a shared character password within said random character table;
retrieve image areas from a shared image that have the same locations within said shared image that said characters of said shared character password have within said random character table, said image areas serving as user credentials;
calculate a one-time password (OTP) by applying at least said user credentials and said random character table to a hash function;
encrypt a security profile that includes said user credentials using said OTP to generate an encrypted profile;
sign said security profile using said OTP to generate a signed profile; and
send a profile update request to a wireless network server, said profile update request including said random character table, said user identity, said encrypted profile, and said signed profile.

12. The wireless communication device of claim 11, wherein:
said random character table comprises a 10×10 table of characters that includes N blank characters, where N is an integer less than 100, and said shared image comprises 10×10 image areas.

13. The wireless communication device of claim 12, wherein N is equal to 6.

14. The wireless communication device of claim 11, wherein:
said hash function is an inconvertible hash function.

15. The wireless communication device of claim 11, wherein:
said controller is programmed to calculate said OTP by applying said user credentials, said random character table, said user identity, and a RADIUS authenticator identity to said hash function.

16. A network server comprising:
digital storage to store shared character passwords associated with a number of different client devices and shared images associated with a number of different client devices; and
a controller programmed to:
receive a profile update request from a remote client device, said profile update request including a random character table, a user identity, an encrypted profile, and a signed profile;
decode said profile update request and extract said random character table and said user identity;
retrieve a shared character password associated with said user identity from said digital storage;
determine locations of characters of said shared character password within said random character table;
retrieve image areas of a shared image associated with said user identity from said digital storage that have the same locations within said shared image that said characters of said shared character password have within said random character table, said image areas serving as user credentials;
calculate a one-time password (OTP) by applying at least said user credentials and said random character table to a hash function;
decrypt said encrypted profile and validate said signed profile using said OTP; and when said profile is validated, assign a new version number to said profile and store said profile.

17. The network server of claim 16, wherein:
said random character table comprises a 10×10 table of characters that includes N blank characters, where N is an integer less than 100, and said shared image associated with said user identity comprises 10×10 image areas.

18. The network server of claim 17, wherein N is equal to 6.

19. The network server of claim 16, wherein:
said hash function is an inconvertible hash function.

20. The network server of claim 16, wherein:
said controller is programmed to calculate said OTP by applying said user credentials, said random character table, said user identity, and a RADIUS authenticator identity to said hash function.

* * * * *